(12) United States Patent
Bosco et al.

(10) Patent No.: US 7,369,165 B2
(45) Date of Patent: May 6, 2008

(54) NOISE FILTER FOR BAYER PATTERN IMAGE DATA

(75) Inventors: Angelo Bosco, Giarre (IT); Massimo Mancuso, Monza (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 837 days.

(21) Appl. No.: 10/232,820

(22) Filed: Aug. 28, 2002

(65) Prior Publication Data

US 2003/0048368 A1   Mar. 13, 2003

(30) Foreign Application Priority Data

Aug. 31, 2001  (EP) ................................ 01830562

(51) Int. Cl.
*H04N 5/335* (2006.01)
(52) U.S. Cl. ...................... 348/272; 348/273
(58) Field of Classification Search ............... 348/272, 348/273
See application file for complete search history.

(56) References Cited

U.S. PATENT DOCUMENTS

| | | | | | |
|---|---|---|---|---|---|
| 5,818,964 | A | * | 10/1998 | Itoh | 382/205 |
| 6,041,145 | A | * | 3/2000 | Hayashi et al. | 382/268 |
| 6,108,455 | A | * | 8/2000 | Mancuso | 382/261 |
| 6,229,578 | B1 | * | 5/2001 | Acharya et al. | 348/607 |

* cited by examiner

*Primary Examiner*—Tuan Ho
(74) *Attorney, Agent, or Firm*—Gardere Wynne Sewell LLP

(57) ABSTRACT

A method of filtering an image filter is disclosed. The filter is provided for a digital camera including image sensors sensitive to light, a color filter placed over sensitive elements of the sensors and patterned according to a Bayer mosaic pattern layout and an interpolation algorithm joining together the digital information provided by differently colored adjacent pixels in said Bayer pattern. The filter is adaptive and includes a noise level computation block for operating directly on a said Bayer pattern data set of for each color channel thus removing noise while simultaneously preserving picture detail.

17 Claims, 12 Drawing Sheets

| G | R | $G_1$ | R | G |
|---|---|---|---|---|
| B | $G_2$ | B | $G_3$ | B |
| $G_4$ | R | $G_0$ | R | $G_5$ |
| B | $G_6$ | B | $G_7$ | B |
| G | R | $G_8$ | R | G |

|   |   |   |   |   |   |
|---|---|---|---|---|---|
| 1 | G | R | G | R | G |
| 2 | B | G | B | G | B |
| 3 | G | R | G | R | G |
| 4 | B | G | B | G | B |
| 5 | G | R | G | R | G |

| G | R | $G_1$ | R | G |
|---|---|---|---|---|
| B | $G_2$ | B | $G_3$ | B |
| $G_4$ | R | $G_0$ | R | $G_5$ |
| B | $G_6$ | B | $G_7$ | B |
| G | R | $G_8$ | R | G |

FIG. 3A

| $R_1$ | G | $R_2$ | G | $R_3$ |
|---|---|---|---|---|
| G | B | G | B | G |
| $R_4$ | G | $R_0$ | G | $R_5$ |
| G | B | G | B | G |
| $R_6$ | G | $R_7$ | G | $R_8$ |

FIG. 3B

| $B_1$ | G | $B_2$ | G | $B_3$ |
|---|---|---|---|---|
| G | R | G | R | G |
| $B_4$ | G | $B_0$ | G | $B_5$ |
| G | R | G | R | G |
| $B_6$ | G | $B_7$ | G | $B_8$ |

Increasing Noise Power

NOISE FILTER FOR BAYER PATTERN IMAGE DATA

CROSS REFERENCE

This application for patent claims priority from European application for patent Serial No. 01830562.3 filed Aug. 31, 2001, the disclosure of which is hereby incorporated by reference.

BACKGROUND OF THE INVENTION

1. Technical Field of the Invention

The present invention relates to a noise filter, and, more particularly to a noise filter for Bayer pattern image data. The invention also relates to a method of filtering noise in Bayer pattern image data.

2. Description of Related Art

Digital cameras generate a datafile that represents an image acquired by the camera. Generally, the camera acquires the information from the light/color sensors in the camera in a CFA (camera filter array) format. A popular format for the CFA is a Bayer mosaic pattern layout, shown in FIG. 1. In a Bayer pattern, each pixel contains information that is relative to only one color component, for instance, Red, Green or Blue. Typically, the Bayer pattern includes a green pixel in every other space, and, in each row, either a blue or a red pixel occupies the remaining spaces. For instance, as seen in FIG. 1, row one alternates between green and red pixels, and row two alternates between green and blue pixels. The end result is a mosaic made of red, green and blue points, where there are twice as many green points as red or blue. This can accurately represent an image because the human eye is more sensitive to the green data than either the red or blue.

A typical camera includes a charge coupled device (CCDs) or CMOS image sensor that is sensitive to light. These image sensors are sensitive only to the intensity of light falling on it and not to the light's frequency. Thus, an image sensor of this kind has no capability to differentiate the color of light falling on it.

To obtain a color image from a typical camera sensor, a color filter is placed over the sensitive elements of the sensor. The filter can be patterned to be like the Bayer pattern discussed above. Then, the individual sensors are only receptive to a particular color of light, red, blue or green. The final color picture is obtained by using a color interpolation algorithm that joins together the information provided by the differently colored adjacent pixels.

The images produced by digital still cameras, especially ones produced by CMOS technology, suffer from noise that is inherently present in the sensor when the image is captured. Thus, some modification of the datafile produced by the image sensor is needed. Oftentimes this modification comes as a filter or algorithm run on the image sensor data (the Bayer Pattern) to create a more realistic image. Processes are performed on it in an imaging process chain, for example, white balance, gamma correction, etc., as shown in FIG. 2. Finally, the corrected image is compressed and stored in memory as a color image.

One problem with current image processing in current digital camera systems is that noise artifacts are difficult to differentiate from detail in the image itself. If noise artifacts are thought to be detail and left unfiltered, or details are thought to be artifacts and are filtered, image degradation occurs.

Another problem exists in that current filtering methods operate on the image data as a whole and do not differentiate between the individual color channels making up the image.

The technical problem solved by this invention is one of how to best filter a complex image file for noise, while at the same time preserving detail in the image.

SUMMARY OF THE INVENTION

The solution to the above-stated problem is that of using an adaptive filtering system in a Bayer pattern image independently for each of the color channels. The adaptive filter allows for a differing amount of filtering action to be performed based on the particular area of image and color of the current pixel. For example, the filtering action could be milder in textured areas of a color channel, where the inconsistencies in data could be related to detail in the scene, but stronger in uniform areas of the color channel, where the aberration is more likely to be noise.

BRIEF DESCRIPTION OF THE DRAWINGS

A more complete understanding of the method and apparatus of the present invention may be acquired by reference to the following Detailed Description when taken in conjunction with the accompanying Drawings wherein:

FIGS. 3A, 3B and 3C are diagrams of filter masks for various colors in the Bayer pattern data, according to an embodiment of the invention;

FIG. 6A shows an example working window of a set of green pixels currently being filtered;

DETAILED DESCRIPTION OF THE DRAWINGS

Figures 1, 14:
FIG. 1, previously described, is a Bayer pattern mosaic layout used in digital cameras of the prior art.
FIG. 14 is a diagram showing the strength levels of filtering as used in the conversion of FIG. 13A to FIG. 13B.

Embodiments of the invention operate directly on a noisy Bayer pattern data and are set to adaptively remove noise while simultaneously preserving picture detail. Once filtered, the Bayer pattern data is sent to the other standard image processing chain processes to produce the image stored on a memory medium.

Some of the calculation steps are similar to those found in U.S. Pat. No. 6,108,455, which is assigned to the applicant, and incorporated herein in its entirety by reference.

In one process, an algorithm filters the image acquired by the sensor of a digital still camera. Thus, the input image is in the Bayer pattern format. This noise filter computes a replacement value for the pixel under processing in the processing window based on a weighted average of the absolute values of degrees of similarity between the target pixel and the plurality of neighboring pixels. The noise filter recursively processes the noise levels to adapt its strength depending on the local features of the acquired image, as well as to adapt to changing noise levels of neighboring pixels.

Two different filter masks are used to filter the three color channels of Bayer pattern data, red, green and blue. One mask operates on the green channel exclusively. The other mask operates on both the red and blue channels, but not simultaneously.

Three different noise level estimations are computed; one for each color channel of the image, red, green and blue. The filter can be instructed to change its strength separately for each of the red, green and blue channels. Generally, the red and blue pixels making up the red and blue channels can be filtered at a higher strength than the green pixels, due to the way the human eye perceives color, but the process is capable of adjusting to any strength in any color channel.

As stated above, two filter masks are used, depending on if the green channel, or either the red or blue channels are being filtered. The different filter masks are illustrated in FIGS. 3A, 3B and 3C.

FIG. 3A shows a filter mask for the green pixels in the Bayer pattern, according to an embodiment of the invention. Generally, for a particular green pixel being filtered, the signal levels of the pixel being filtered and its neighboring pixels are examined. For instance, with reference to FIG. 3A, a green pixel G0 is the target pixel; a working window including a portion of the pixels neighboring the target pixel G0 is established, for instance by including the neighboring pixels G1, G2, G3, G4, G5, G6, G7, and G8.

Similarly, with reference to FIG. 3B, a working window is established with a filter mask for the Red channel. This filter mask differs from the filter mask shown in FIG. 3A because, as discussed with reference to FIG. 1, the pixel arrangement in the Bayer pattern is different for the green channel than either the red or blue channels. In the red filter mask, shown in FIG. 3B, a target pixel R0 is surrounded by its neighboring pixels R1, R2, R3, R4, R5, R6, R7, and R8.

Figures 3C, 6A:

Similarly, the blue filter mask, shown in FIG. 3C, has a target pixel B0 surrounded by its neighboring pixels B1, B2, B3, B4, B5, B6, B7, and B8. In each of the cases for red, green and blue, there is one target pixel and eight neighboring pixels, which will be referred to generically as T0 and T1-T8, respectively.

The input image in the Bayer pattern format is scanned sequentially row by row, beginning on the top row, from left to right. In embodiments of the invention, the processing windows for the red and blue channels are identical, while the processing window for the green channel is different. When the picture is processed, only one of the two types of processing windows is selected, and thus, the selection is based dependent on whether the current pixel color is green.

Figure 4:
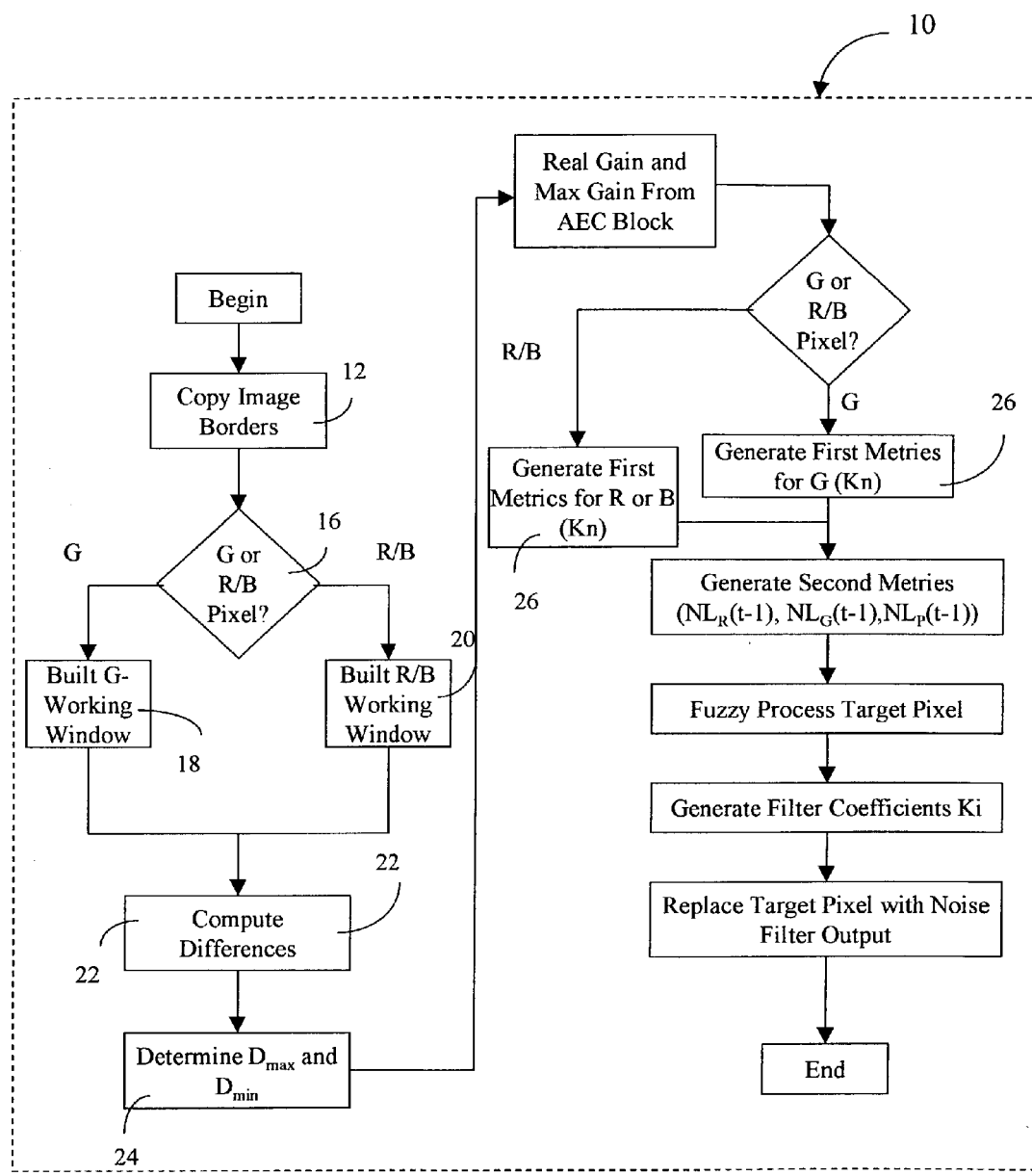
FIG. 4 is a flow diagram illustrating example processes that are present in embodiments of the inventive adaptive noise filter.

FIG. 4 is a flow diagram illustrating example processes that are present in embodiments of the inventive adaptive noise filter. The adaptive noise filter 10 begins with a step of copying image borders 12, which will be discussed below. As described above, a determiner 16 then examines the current pixel T0 to see if it is green or not. If T0 is a green pixel, a green working window 18, such as seen in FIG. 3A is produced. Instead, if T0 is not green, a red/blue working window 20 is produced such as seen in FIG. 3B or 3C.

Once the mask and filter window is selected, a distance calculation is made in a difference calculator 22. In the difference calculator 22, an absolute value difference Di is determined between the target pixel T0 and its neighboring pixels. Each difference Di represents the difference in between the value of the target pixel T0 and the values of its neighboring pixels. The difference calculator 22 computes the absolute values of the differences Di between the target pixel T0 value of the current working window and the values of its neighboring pixels T1-T8 to produce the difference values D1, D2, D3, D4, D5, D6, D7, and D8.

Once the differences in pixel values are calculated, the results are sent to a maximum and minimum block 24. In that block, the maximum and minimum distance values are computed from the list of difference values D1-D8. The output of the max/min block 24 is the maximum difference Dmax and the minimum difference Dmin between the target pixel T0 and its neighboring pixels T1-T8 of the current working window 18 or 20.

These minimum and maximum differences are passed to a noise level computation block 26, which, without using autoexposured data, makes an estimation of a noise level NL associated with the processing window 18 or 20. Depending on whether the processing window 18 (green) or processing window 20 (red or blue) is the current window, different NL calculations are made and stored simultaneously, one for each color channel. Depending on the color of the current pixel T0, the noise level block 26 updates the relative noise level estimation for that particular color. Thus, the noise level block 26 estimates the noise level according to the following calculations:

$$NLR(t-1)=Kn(t-1)*D\max(t-1)+ [1-Kn(t-1)]*NLR(t-2) \quad (1)$$

$$NLG(t-1)=Kn(t-1)*D\max(t-1)+ [1-Kn(t-1)]*NLG(t-2) \quad (2)$$

$$NLB(t-1)=Kn(t-1)*D\max(t-1)+ [1-Kn(t-1)]*NLB(t-2) \quad (3)$$

where NLx is the noise level of the particular noise channel, x; Kn is a parameter that determines the strength of filtering to be performed by the adaptive noise filter 10, as discussed in the above-referenced US patent and as further discussed below, and wherein Dmax is the maximum distance value computed for the particular color channel in max/min block 24.

Figure 5:
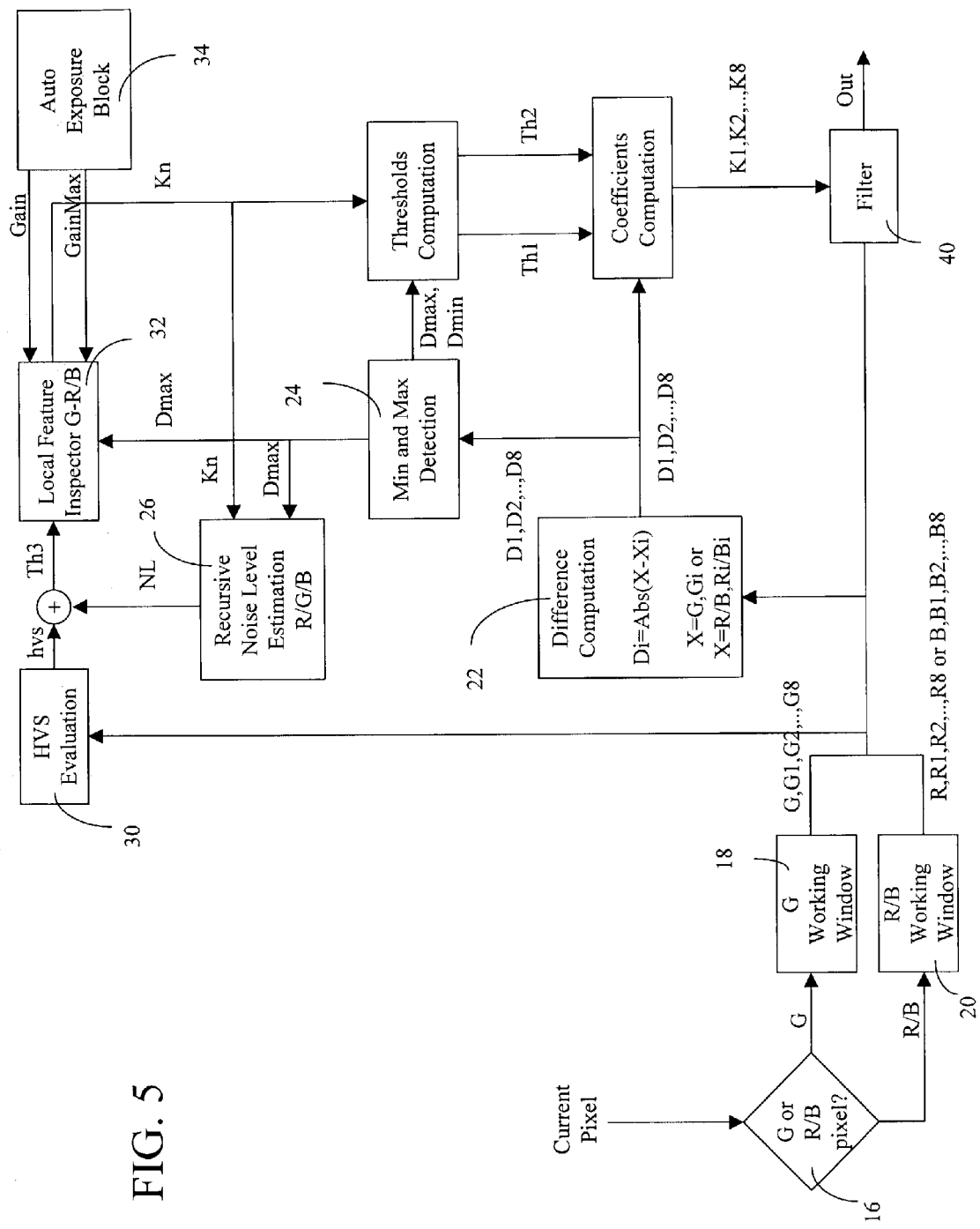
FIG. 5 is an example block diagram showing interrelationships of processes in the adaptive noise filter according to an embodiment of the invention.

Examples of the interrelationship of different processes can be seen in the example block diagram of the inventive adaptive noise filter 10 in FIG. 5. In that FIGURE the difference calculator 22 takes its input from the current processing window 18 or 20. The output from the difference calculator 22 is passed to the max/min block 24, which passes Dmax and Dmin values for each color to the noise level block 26. The Kn parameter is also an input to the noise level block 26.

Generally, these processes used in the adaptive noise filter 10 can be implemented in software or hardware, although hardware is generally preferred for performance reasons. It is fundamental to process the input noisy image as quickly as possible using a minimum amount of resources to perform all of the computations. In order to achieve these goals, the noise level computation block 26, according to an embodiment of the invention, uses a recursive implementation. Typically, two image buffers can be used to execute the entire filtering process. One buffer (an input buffer) contains the image to be filtered; the other buffer (the output buffer) contains the filtered image.

In order to make best use of the resources required by the processes, the filtered value of the current target pixel T0 is computed using the pixel values that have already been filtered. For example, if T0 is the target pixel, and T1, T2, T3 and T4 have already been processed, then T5, T6, T7 and T8 have yet to be processed. Keeping track of already filtered pixels is a good practice to reduce the computational requirements of the various processes. As the Bayer pattern image is scanned row by row, the already filtered values are available in memory and they can be used to filter the next pixel without having to reload into the memory the old unfiltered values of T1, T2, T3 and T4. This process can be used for both the Green working window 18, and the Red/Blue working window 20.

Figure 6B:
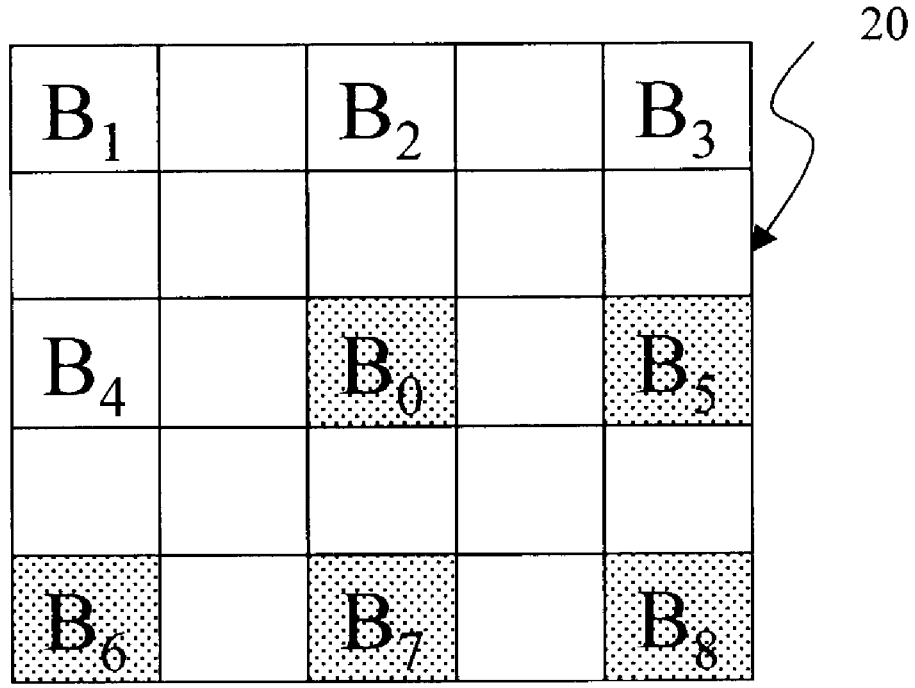
FIG. 6B shows an example working window of a set of non-green pixels currently being filtered.

FIG. 6A shows an example working window 18 of a set of Green pixels, G0 (the target pixel), G1, G2, G3 and G4, which have already been filtered, and G5, G6, G7 and G8 which have yet to be filtered. FIG. 6B shows an example working window 20, which in this case happens to be blue, although it would be identical for the red color channel. In FIG. 6B, B0 is the target pixel being filtered, B1, B2, B3 and B4 have already been filtered, and B5, B6, B7, and B8 have not been filtered yet.

Figure 7:
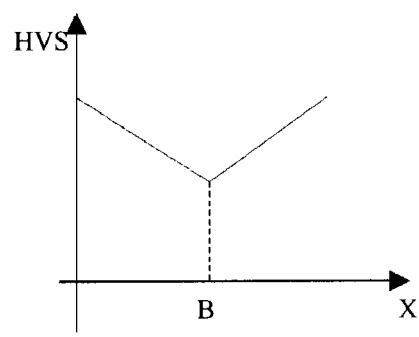
FIG. 7 is a chart of a human vision threshold factor for nearby pixels as it relates to the brightness of the desired pixel.

Returning back to FIG. 5, an human visual system (HVS) evaluator 30 is shown, which receives its input from the working windows 18 and 20. The HVS evaluator 30 factors the human eye's response to a brightness change according to the function shown in FIG. 7. In that FIGURE, the X-axis measures possible brightness values on a scale between 0 and 1023, while the Y axis charts the threshold level where the human eye can determine a difference in grey level values between a current pixel and its neighboring pixels. As shown in FIG. 7, when a pixel is in the middle (x=512) of the dark (x=0) and the brightest value (x=1023), the HVS threshold of the human eye is the lowest. Therefore, the HVS threshold of the human eye is the highest when the pixels are very bright or very dark, as shown in FIG. 7.

Figure 8A:
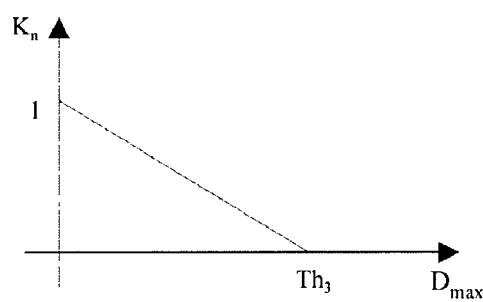
FIG. 8A is a graph of the Kn parameter as a function of the maximum distance value Dmax when the current pixel is green.
Figure 8B:
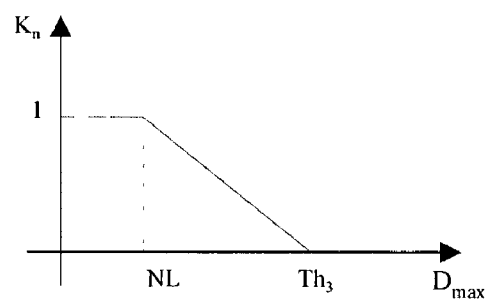
FIG. 8B is a graph of the Kn parameter as a function of the maximum distance value Dmax when the current pixel is not green.

The factor from the HVS evaluator 30 is summed with the output of the noise level block 26 and provide to a local feature inspector block 32 (FIG. 5). That block 32 computes the Kn parameter that is used to modulate the strength of the filtering process to be executed on the current pixel T0 in the noise level block 26. Depending on the color of the current pixel T0, either green or red/blue, two different local feature inspector functions are used. Specifically, if the current pixel being filtered is green, then the standard local feature inspector block is used. This is illustrated in FIG. 8A, which is a graph of the Kn parameter as a function of the maximum distance value Dmax when the current pixel is green. Shown in FIG. 8A is a value Th3, which is the noise value plus the HVS value for the current pixel T0, (Th3=NL+HVS). In FIG. 8A, the Kn parameter is a straight line starting at 1 (when Dmax is at its minimum), and extending down to Th3. FIG. 8B, conversely, is a graph of the Kn parameter as a function of the maximum distance value Dmax when the current pixel is not green. FIG. 8B introduces another value to the calculation of the Kn parameter, which is the noise level NL. Thus, when Dmax has a value that is less than or equal to the NL, then the Kn parameter will be 1, otherwise the Kn parameter has a value found along the line between 1 and Th3. This augments the filter strength on the red and blue channels compared to the green channel, because the Kn parameter for the green channel can only be 1 when Dmax is at 0, while the Kn parameter for the red and blue channels is always 1 when Dmax is less than or equal to the NL.

An additional way to control the degree of filtering the Bayer pattern data is to include a gain factor used by the autoexposure control (AEC). Such a block including AEC is illustrated as 34 in FIG. 5. The degree of filtering can be modulated depending on the current gain factor used by the AEC block 34. The autoexposure process in a digital camera generates an appropriate set of exposure settings and gain settings in order to obtain a correctly exposed scene. If the image scene is correctly exposed, then no gain factor needs to be applied to the image. If, on the other hand, the image cannot be correctly exposed, then the autoexeposure process of the camera computes a gain factor, which is a sort of coefficient that is applied to the image. The higher the gain, the brighter the image. There are some drawbacks to this universal system, however. If the gain is set to a too high value, noise is also enhanced in the image. Therefore, when the gain is high, the noise filter must act with a higher strength, and when the gain is low, or at zero, then the noise filter should act with a lower strength.

Figures 9, 11:
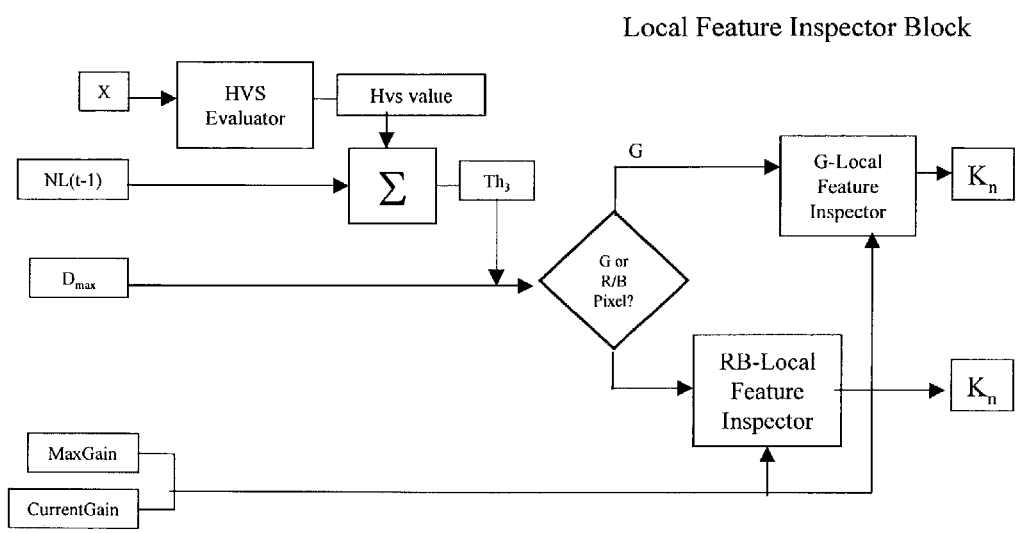
FIG. 9 is a graph showing a different way to generate the Kn parameter using a gain variable.
FIG. 11 is a diagram showing an edge of a Bayer pattern dataset.

The adaptive noise filter 10 can include a process that uses the following approach, as illustrated with reference to FIG. 9. That FIGURE shows how an extra factor (the AEC gain factor) can be used to create the Kn parameter. If G is the current AEC gain factor computed by the AEC block 34 of FIG. 5, and Gmax is the Maximum value of the gain factor, which will depend from the image sensor), then a ratio of G/Gmax can be calculated. This ratio, as shown in FIG. 9, is multiplied by the noise level factor NL to determine the highest Dmax value that will have the Kn parameter equal to 1. This differs to the graph shown in FIG. 8B, which did not include the gain G/Gmax ratio factor. Thus, if to obtain the best exposed image G is set to Gmax, then this means that the G/Gmax ratio is 1, so the threshold that separates the maximum degree of filtering (Kn=1) from the other degrees of filtering is the noise level NL. Conversely, if the correctly exposed picture is reached with a gain G such that 0<=G<=Gmax, then NL*G/Gmax<=NL, because G/Gmax<=1. So, the threshold that is used to discriminate between the higher degree of filtering from the other degrees is lower, hence the filter strength is lowered. This technique can be applied to all of the three color channels, or it may be used on only the red/blue channels, while the green channel may be filtered in the standard mode shown in FIG. 8A.

Figure 2:
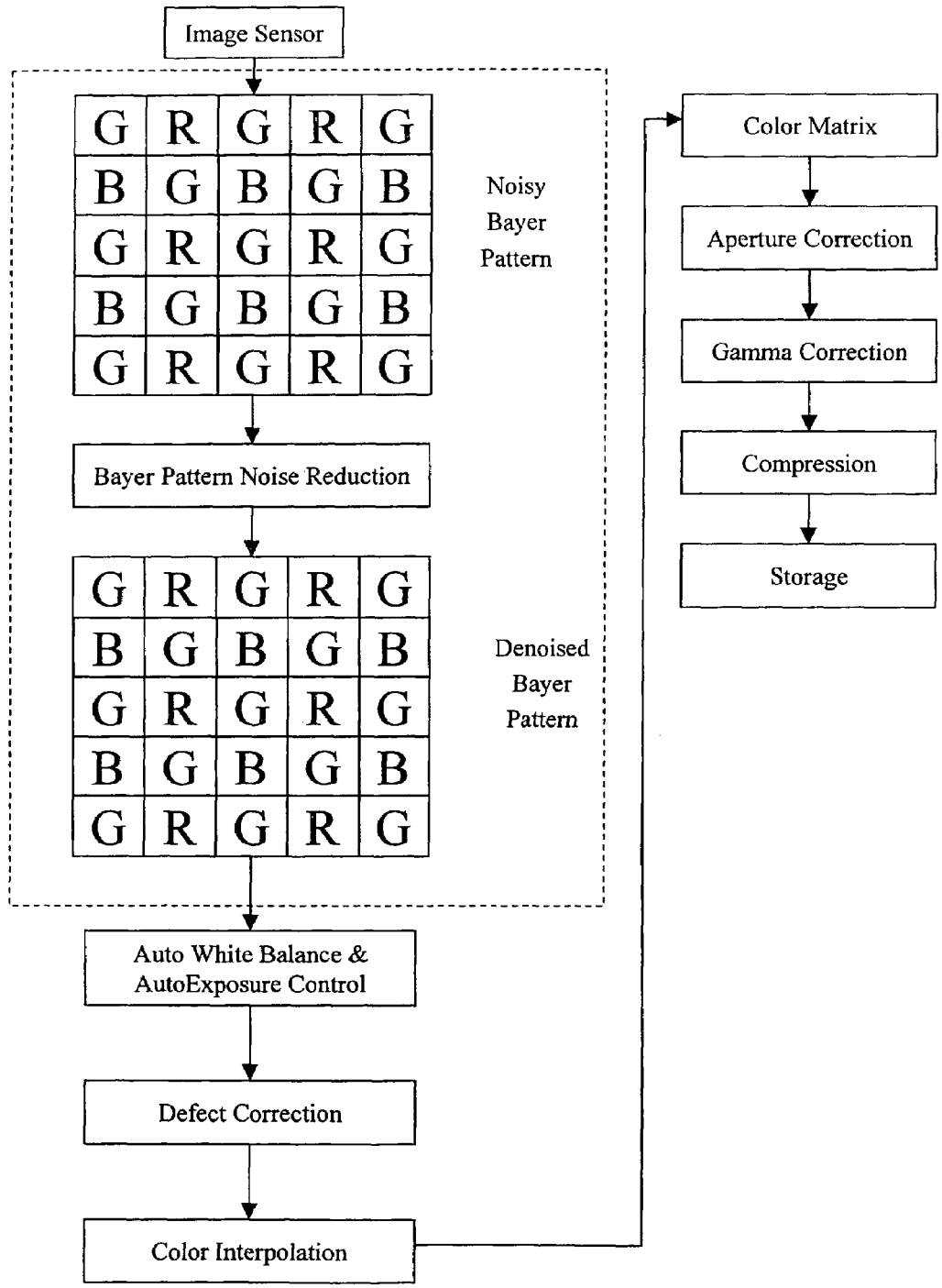
FIG. 2, previously described, is an example functional block diagram of image processes of a prior art digital camera.

With reference to FIG. 5, it may be necessary for the AEC block 34 to provide its output prior to the time the noise levels are calculated by the noise level computation block 26. This is not problematic because the noise level computation block 26 and other portions of the adaptive noise filter 10 are not restricted to be the first element of an image processing chain. The adaptive noise filter 10 can actually be positioned much later in the image manipulation process (FIG. 2), such as within the defect correction block, if necessary. When the adaptive noise filter 10 is positioned in the defect correction block of the image processing chain, it accepts as an input the noisy pixel. Then, the de-noised value is passed as output from the adaptive noise filter to the defect correction algorithms in order to generate the final denoised and defect corrected pixel of the Bayer pattern to be passed to the rest of the image processing chain.

The final process to be performed on the pixel value is based on fuzzy logic. The membership computation block is associated to a fuzzy function bounded by two threshold values Th1 and Th2. The fuzzy function fuzzifies the relation "the target pixel T0 and its neighbor pixel Ti are similar", where Ti is any of the neighboring pixels T1-T8. For each neighboring pixel Ti of T0, a coefficient Ki is computed, which weights the similarity between T and Ti. These weight coefficients Ki are later used in the final determination of the filtered value. Thus, for every pixel T0, there will be eight coefficient values, K1-K8, where K1 weighs the similarity between T0 and T1, K2 weighs the similarity between T0 and T2, etc., up to K8.

Figure 10:
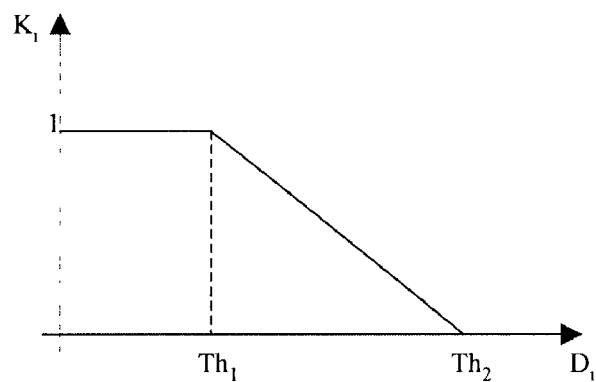
FIG. 10 is an example diagram of a fuzzy function able to fuzzify relations of pixels according to an embodiment of the invention.

An example diagram of a fuzzy function able to fuzzify the above relation is shown in FIG. 10. The two threshold values Th1 and Th2 can be factored according to the following equations:

$$Th1 = Kn(t)*Dmax(t) + [1-Kn(t)]*Dmin(t) \quad (4)$$

$$Th2 = Kn(t)*Dmax(t) + [1-Kn(t)]*Dmin(t)* \\ ([Dmax(t)+Dmin(t)]/2) \quad (5)$$

The value of Ki can be expressed through the following relations:

$$Ki=1, \text{ when } Di <= Th1 \quad (6)$$

$$Ki=(Th2-Di)/(Th2-Th1), \text{ when } Th1 < Di < Th2 \quad (7)$$

$$Ki=0, \text{ when } Th2 >= Di \quad (8)$$

These values are calculated in a threshold calculation block 36 shown in FIG. 5, which accepts as inputs the threshold factor Kn, Dmin, and Dmax, and produces the threshold values Th1 and Th2 shown above.

These threshold values are input to a coefficient calculator 38, which calculates the Ki values of equations 6, 7 and 8.

A final output of the adaptive noise filter 10 is the filtered value of the current target pixel T0. By repeating this process sequentially for every pixel produced by the camera sensor, the final filtered image is obtained at its output. The output of the noise filter 10 can be shown to be as follows:

$$pixOut = \frac{1}{8}\sum_{1}^{8} k_i(t) \cdot T_i + [1 - k_i(t)] \cdot T_0 \quad (9)$$

As stated previously, the adaptive noise filter 10 works on Bayer pattern source data. Considering the shape of the processing windows it can be noticed that it is not possible to process those pixels belonging to the first and last two rows of the image, and those pixels belonging to the first and last two columns, because there are not enough pixels to create a full working window 18 or 20 (FIGS. 3A, 3B and 3C). This concept is illustrated with reference to FIG. 11, a Bayer pattern showing the first five columns and five rows of an edge of an image is shown. It is impossible to create a full working window 18 for the first green pixel located in the first column and first row, because it does not have enough surrounding pixels.

Figure 12:
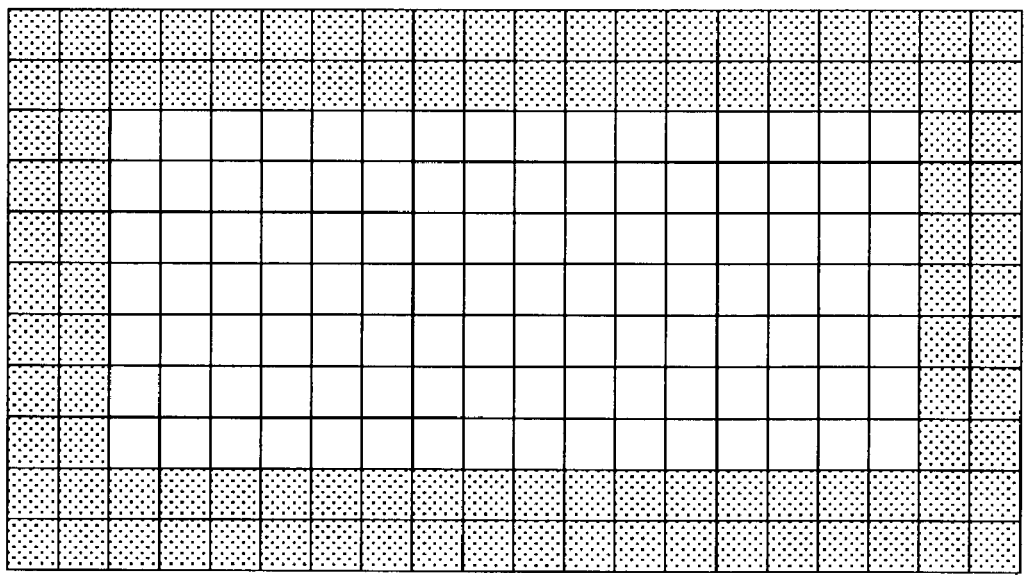
FIG. 12 is a diagram of an image formed by pixels, highlighting the border made of two pixels.

Therefore, as illustrated in FIG. 12, some embodiments of the invention leave the two-pixel-wide borders of the image in their original condition, and do not filter these particular borders. That is why, with reference to FIG. 4, the border copying step 12 is the first step to be performed. Thus, in order to obtain an image that has the same number of rows and columns as the originally input noisy image, the first and last two rows and columns are copied directly to the output buffer, although they may be temporarily stored prior to insertion into the output buffer. This step is shown as the block 40 of FIG. 5, the filter output block.

Figure 13A:
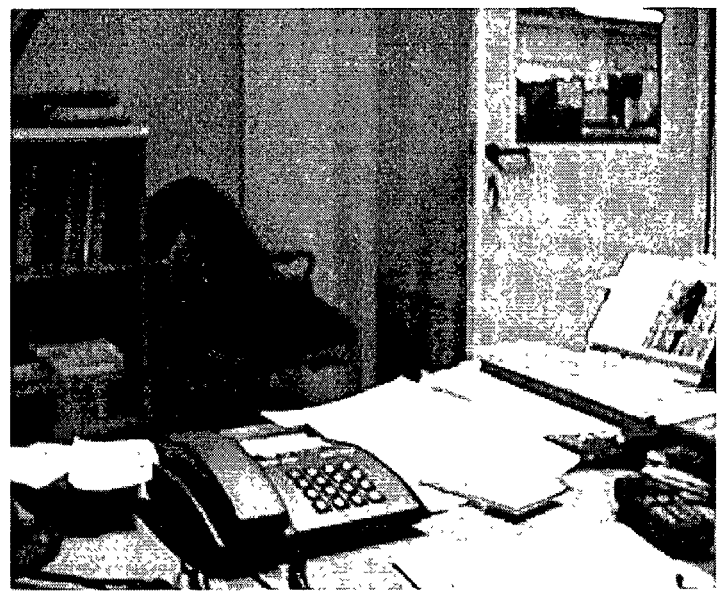
FIG. 13A is an original control image.
Figure 13B:
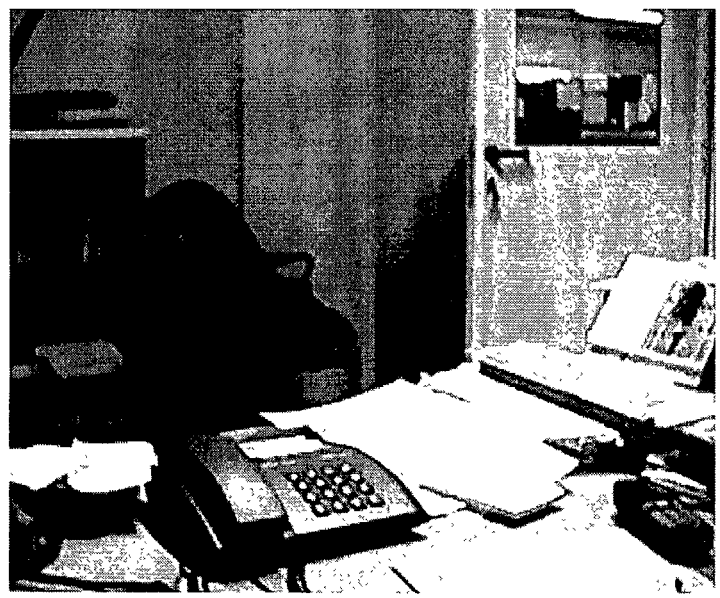
FIG. 13B is the image of FIG. 13A after it has been modified by an adaptive noise filter according to an embodiment of the invention.

FIGS. 13A and 13B show an original image and an image taken from the output of an embodiment of the adaptive noise filter 10, respectively. The adaptiveness of the algorithm is clearly visible by viewing these FIGURES. For instance, the walls and paper on the desk have a much reduced noise-value, but detail is not lost around the buttons of the phone, for instance.

FIG. 14 is a diagram generated showing the strength of the filtering of FIG. 13A to produce FIG. 13B. The light grey zones represent heavily filtered areas, and dark grey zones represent lightly filtered areas. The paper on the desk had one of the strongest amounts of noise filtering applied to it, while the borders of the objects get almost no filtering at all—to preserve their details. One of the reasons for this is seen with reference to equation 8 above. That equation forces Ki, which is directly involved in the output pixel equation of equation 9 to zero when the distance Di is greater than the second threshold, Th2. At the borders of objects, there will be a large distance in pixel values, because of the sharp edge. Using the adaptive filtering techniques described herein, the sharp edges (and hence detail) is preserved, while other noise, such as in large blocks of monochrome color (as in sheets of paper, walls, and other large surfaces) get a strong amount of noise filtering, thus producing an overall high quality image.

Figure 15:
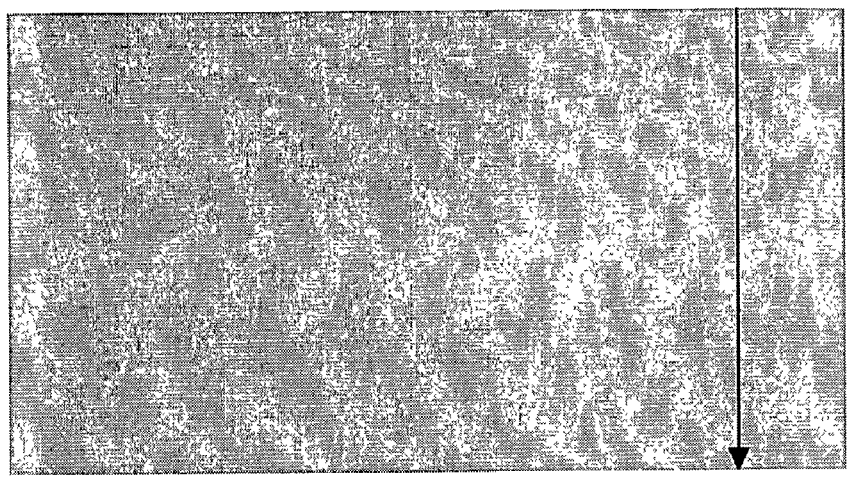
FIG. 15 is an example test image having an increasing amount of noise from top to bottom.

In testing different embodiments of the processes, a synthetic image was used to determine how much noise the algorithm is capable of removing. FIG. 15 is the test image, which has an increasing amount of noise from top to bottom. To modulate the power of the added noise, the variance value of a Gaussian distribution was manipulated. The mean value of the noise statistical distribution is assumed to be zero.

If:

INOISY denotes a noisy Bayer pattern;

IFILTERED denotes the Bayer pattern filtered by the adaptive noise filter 10; and IORIGINAL denotes the original noiseless Bayer pattern, Then:

INOISY—IORIGINAL=IADDED_NOISE; and

IFILTERED—IORIGINAL=IRESIDUAL_NOISE.

Where IADDED_NOISE is the image that contains only the noise that was artificially added to IORIGINAL. Whereas IRESIDUAL_NOISE is the image containing the residual noise after filtering. Given an image x (n,m), N*M, noise power can be computed according to the following formula:

$$P = \frac{1}{MN} \sum_{n=0}^{N-1} \sum_{m=0}^{M-1} x(n, m)^2 \quad (10)$$

Figure 16:
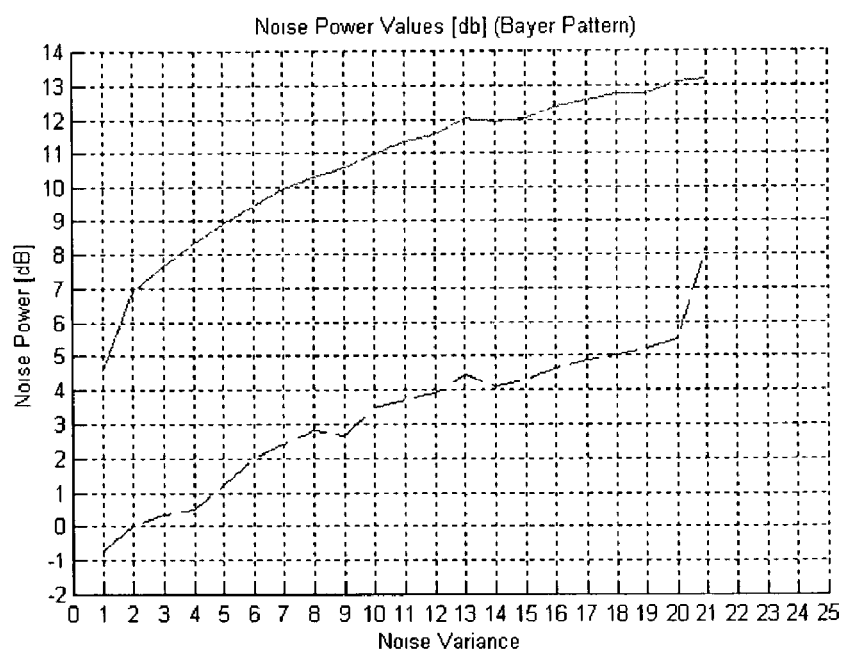
FIG. 16 is a graph of noise power computed for different noise levels with reference to FIG. 15.

Noise power has been computed for both IADDED_NOISE and IRESIDUAL_NOISE using the image of FIG. 15, transformed into decibel (dB) form, and graphed in FIG. 16. The y-axis of the graph in FIG. 16 represents the noise power expressed in dBs, and the x-axis represents the variance of the noise distribution. The difference between the two plots indicates how much noise was reduced using the embodiment of the adaptive noise filter 10. In this test, the noise power of the filtered image is about 7 dB less than the original noise power, however, the adaptive noise filter is still able to discriminate between high texture and low texture areas.

One of the attractive benefits of embodiments of the adaptive noise filter 10 is the ability to work directly on Bayer pattern data. Its adaptations are color specific, and therefore produce better overall results than if they are simply averaged. Using gain factors from the autoexposure data combined with the human visual system, excellent pre-determinations are able to be made about how much filtering can be safely applied to specific pixels. Also, the noise filter works quickly because of its ability to recursively compute based on pixel values already calculated, using less amount of memory in a hardware implementation.

Changes can be made to the invention in light of the above detailed description. In general, in the following claims, the terms used should not be construed to limit the invention to the specific embodiments disclosed in the specification and the claims, but should be construed to include all methods and devices that are in accordance with the claims. Accordingly, the invention is not limited by the disclosure, but instead its scope is to be determined by the following claims.

What is claimed is:

1. An image filter for filtering a Bayer pattern, comprising:
   an interpolation algorithm that joins together the digital information provided by differently colored adjacent pixels in a plurality of color channel Bayer patterns; and
   the filter being adaptive and operable directly on the Bayer patterns for each color channel to remove noise while simultaneously preserving picture detail; and
   wherein at least two filter masks are used, one for a green channel and the other for a red and blue channels, and wherein the filter masks for the red and blue channels have an identical pattern comprising neighboring pixels arranged in a square pattern surrounding a center red/blue target pixel while the filter mask for the green channel has a pattern comprising eight neighboring pixels arranged in a diamond pattern surrounding a center green target pixel.

2. An image filter for filtering a Bayer pattern, comprising:
   an interpolation algorithm that joins together the digital information provided by differently colored adjacent pixels in a plurality of color channel Bayer patterns;
   the filter being adaptive and operable directly on the Bayer patterns for each color channel to remove noise while simultaneously preserving picture detail;
   a determination function that examines a current pixel in a processing window, determines its color, and selects an appropriate filtering mask for that color;
   a difference calculator that determines an absolute value difference between said current pixel and the values of a plurality of its neighboring similarly colored pixels in said processing window;
   a maximum and minimum determination function that computes a maximum and minimum one of the determined distance values; and
   a noise level computation function that estimates a noise level associated with said processing window.

3. The image filter according to claim 2 further including a gain factor function comprising an autoexposure control system that generates an appropriate set of exposure and gain settings fed to said noise level computation function.

4. The image filter according to claim 2 wherein said noise level computation function uses a recursive implementation and estimates the noise level according to the following calculations:

$$NLR(t-1) = Kn(t-1)*D\max(t-1) + [1-Kn(t-1)]*NLR(t-2);$$

$$NLG(t-1) = Kn(t-1)*D\max(t-1) + [1-Kn(t-1)]*NLG(t-2);$$

$$NLB(t-1) = Kn(t-1)*D\max(t-1) + [1-Kn(t-1)]*NLB(t-2)$$

where NLx is a noise level of the particular noise channel, x; Kn is a parameter that determines a strength of filtering to be performed by the filter, and Dmax is the maximum distance value.

5. A method for filtering noise in a digital image, comprising the steps of:
   interpolating the digital image to join together digital information provided by differently colored adjacent pixels and produce a plurality of color channel Bayer patterns;
   scanning sequentially row by row through a selected Bayer pattern;
   providing a processing window for each color channel of said Bayer pattern data set, the processing windows for the red and blue channels being identical, while the processing window for the green channel being different, and each processing window having a target pixel and a plurality of neighboring pixels;
   selecting a filtering mask and a corresponding processing window in dependence on color of a current target pixel; and
   filtering the target pixel by computing a noise level of the color channel and providing a filtered pattern format depending on said noise level.

6. The method according to claim 5, wherein the filtered value of the current target pixel is computed using the pixel values that have already been filtered during said scanning step.

7. An image filter for processing a color channel of Bayer pattern data, comprising:
   a working window function that identifies a target pixel in the Bayer pattern data along with a plurality of neighboring pixels to the target pixel having a common color;
   a comparator function that compares the common color target and neighboring pixels; and
   a filtering function that determines a filtered value for the target pixel based on the common color target and neighboring pixels comparison by:

resisting change in the target pixel value when the comparison indicates dramatic difference between the target and neighboring pixels; and encouraging change in the target pixel value when the comparison indicates minimal difference between the target and neighboring pixels.

8. The filter as in claim 7 wherein the comparator function implements a fuzzy logic processing operation.

9. The filter as in claim 7 wherein the filtering function resists change by reducing a weighting factor applied to each of the neighboring pixel values if the comparison indicates dramatic difference between the target and neighboring pixels.

10. The filter as in claim 7 wherein the filtering function encourages change by increasing a weighting factor applied to each of the neighboring pixel values if the comparison indicates minimal difference between the target and neighboring pixels.

11. The filter as in claim 7 wherein the filtering function calculates the filtered value of the target pixel as a sum of:
a weighting factor times the neighboring pixel value; and
one minus the weighting factor times the target pixel value;
wherein the sum is calculated across the plurality of neighboring pixels.

12. An image filter for processing a color channel of Bayer pattern data, comprising:
a working window function that identifies a target pixel in the Bayer pattern data along with a plurality of neighboring pixels to the target pixel having a common color;
a comparator function that compares the common color target and neighboring pixels; and
a filtering function that determines a filtered value for the target pixel based on the common color target and neighboring pixels comparison that:
preserves image detail where the comparison indicates dramatic difference between the target and neighboring pixels; and
corrects noisy pixels where the comparison indicates minimal difference between the target and neighboring pixels.

13. The filter as in claim 12 wherein the comparator function implements a fuzzy logic processing operation.

14. The filter as in claim 12 wherein the filtering function preserves image detail by resisting change in the target pixel value by reducing a weighting factor applied to each of the neighboring pixel values if the comparison indicates dramatic difference between the target and neighboring pixels.

15. The filter as in claim 12 wherein the filtering function corrects noisy pixels by encouraging change by increasing a weighting factor applied to each of the neighboring pixel values if the comparison indicates minimal difference between the target and neighboring pixels.

16. The filter as in claim 12 wherein the filtering function calculates the filtered value of the target pixel as a sum of:
a weighting factor times the neighboring pixel value; and
one minus the weighting factor times the target pixel value;
wherein the sum is calculated across the plurality of neighboring pixels.

17. An image filter for filtering a Bayer pattern, comprising:
an interpolation algorithm that joins together the digital information provided by differently colored adjacent pixels in a plurality of color channel Bayer patterns; and
the filter being adaptive and operable directly on the Bayer patterns for each color channel to remove noise while simultaneously preserving picture detail; and
wherein at least two filter masks are used, one for a green channel and the other for a red and blue channels, and wherein the filter masks for the red and blue channels have an identical pattern consisting only of plural neighboring pixels arranged in a square pattern surrounding a center red/blue target pixel while the filter mask for the green channel has a pattern consisting only of plural neighboring pixels arranged in a diamond pattern surrounding a center green target pixel.

* * * * *